United States Patent
Janotte

[11] Patent Number: 6,097,979
[45] Date of Patent: Aug. 1, 2000

[54] RADIATION THERMOMETER AND PROTECTIVE COVER THEREFOR

[75] Inventor: Michael Janotte, Kronberg, Germany

[73] Assignee: Braun GmbH, Kronberg, Germany

[21] Appl. No.: 09/093,630

[22] Filed: Jun. 5, 1998

[30] Foreign Application Priority Data

Jun. 7, 1997 [DE] Germany .............. 197 24 054

[51] Int. Cl.⁷ .......................................... A61B 5/00
[52] U.S. Cl. ............................................... 600/474
[58] Field of Search ................. 600/474, 473

[56] References Cited

U.S. PATENT DOCUMENTS 4,993,424  2/1991  Suszynski et al. .
5,588,748  12/1996  Nomura et al. .

FOREIGN PATENT DOCUMENTS 9006090  6/1990  European Pat. Off. .
0502277  9/1992  European Pat. Off. .
0565123  10/1993  European Pat. Off. .
4422974  1/1995  European Pat. Off. .

*Primary Examiner*—Scott M. Getzow
*Attorney, Agent, or Firm*—Hopgood, Calimafde, Kalil & Judlowe, LLP

[57] ABSTRACT

The invention is directed to a radiation thermometer, in particular an infrared radiation thermometer for performing a temperature measurement in a person's ear, including a housing (10) with a probe (20) on which a protective cover (40) is mountable. The radiation thermometer of the present invention includes in its housing (10) a cavity (11) for receiving at least one protective cover (40), and a holding device (30) which may be equipped with several protective covers (40). The protective covers (40) have holding means for affixing them to the holding device (30).

15 Claims, 2 Drawing Sheets

RADIATION THERMOMETER AND PROTECTIVE COVER THEREFOR

FIELD OF THE INVENTION

This invention relates to radiation thermometers, in particular infrared radiation thermometers for performing a temperature measurement in a person's ear, including a housing with a probe over which a protective cover is mountable, as well as protective covers therefor.

BACKGROUND OF THE INVENTION

To obtain a quick and accurate reading of the body temperature, the probe of a radiation thermometer is simply inserted into the ear canal in order to measure the infrared radiation emitted by the tympanic membrane which is accurately representative of the body's core temperature. In contrast to conventional mercury thermometers, infrared thermometers have proven to operate not only substantially more quickly but also eliminate the risk of cross contamination due to contact with mucous is membranes as may occur, for example, when the temperature is taken orally or rectally using mercury thermometers.

From U.S. Pat. No. 4,602,642 A and U.S. Pat. No. 4,784,149 A radiation thermometers are known having control units with a probe and depository units serving to receive the respective control unit and a supply of protective covers for the probes. Because of their large dimensions, these radiation thermometers are only suitable for stationary use.

From EP 0 565 123 A1 a portable radiation thermometer is known whose probe may be provided with a protective cover for measurement and otherwise may be protected by a housing cap. When a physician, for example, wishes to carry this radiation thermometer with him to visit his patients, it will be necessary for him to carry not only the thermometer but also a separate storage container for the protective covers, because sanitary reasons demand that a new protective cover be used for each temperature measurement. Taking a measurement with such a radiation thermometer is rather a complicated procedure because the housing cap to be removed for measurement needs to be handled as a third individual part aside from the thermometer and the storage container holding the protective covers, making two-hand operation impossible.

From EP 0 502 277 A2 an infrared ear thermometer is known having an enclosed housing to the lower end of which a housing extension is attachable which serves as a storage container for protective covers nested inside each other. This thermometer possesses no housing cap for protection of the delicate probe.

From U.S. Pat. No. 5,088,834 A it is known to arrange a plurality of conical protective covers in a receptacle in nested fashion. A protective cover is installed over a probe by inserting the probe into the topmost protective cover. Suitable protective covers are known, for example, from EP 0 419 100 A and EP 0 472 490 A, which have a window that is transparent to radiation in the infrared region.

From WO 95/00067 protective covers are known having ears ensuring on the one hand a secure seating engagement of the protective cover with the thermometer's probe while on the other hand actuating a switch serving as a detector to establish the presence or absence of a protective cover. A temperature measurement can be performed only with the switch actuated. In lieu of ears, a circumferential reinforcement of the protective cover's rim may also be provided.

SUMMARY OF THE INVENTION

It is an object of the present invention to provide a portable radiation thermometer and matching protective covers, which not only has reduced space requirements but also affords ease of handling.

To accomplish this object, there is provided in a radiation thermometer according to the present invention a cavity for receiving at least one protective cover. The housing of the radiation thermometer advantageously has a lid. By opening the lid, the cavity and the protective covers stored therein are accessible.

In accordance with one aspect of the invention, a holding device for the protective covers is secured to the lid. The lid and the holding device combine to form a magazine in which several protective covers may be received. In another embodiment, a protective cover magazine is insertable in the cavity which is closable by the lid.

In accordance with another aspect of the invention that affords particular ease of handling, the housing of the radiation thermometer has an opening for insertion and removal of the magazine. To this effect, corresponding guide means are provided in the housing and on the magazine.

A known detent mechanism, a latching device or the like prevents the magazine from slipping out inadvertently once it is inserted. With the magazine inserted into the radiation thermometer, an end piece of the magazine forms the lid that closes the opening of the housing.

It is particularly advantageous to arrange a probe at one end of the housing, and to insert the magazine in an opening at the other end of the housing to allow the magazine to be withdrawn from and reinserted into the housing with the one hand without the need for the other hand holding the thermometer to change its grip.

Protective covers conformed to the holding device of the radiation thermometer of the present invention preferably have holding means on their rims that are shaped to a corresponding configuration. For example, when the holding device has at least one holding pin, the protective covers have on their rims at least one eyelet through which the holding pin fits. In another embodiment, the protective covers are held in the magazine between at least two holding bars which may include holding noses suitable for engagement in corresponding notches on the rims of the protective covers. Preferably, the notches are provided in holding tabs integrally formed on the rim of the protective cover. Apart from the holding means, the protective covers of the present invention exhibit the structure known in the art.

Moreover, to protect the probe, the radiation thermometer includes in a known manner a housing cap which is mountable on the probe and removable therefrom for temperature measurement. However, the housing cap is not only demountably attachable to the housing of the radiation thermometer in the area of the probe, but according to the invention also to the lid, to the holding device or to the end piece of the protective cover magazine where it may serve as a handle member to facilitate handling of the protective cover magazine. The housing cap may be mounted in a manner known in the art, using, for example, a preferably latchable detent connector, a bayonet connector or the like. In the use of a bayonet connector, particularly the end piece of the magazine is preferably not round to prevent twisting of the magazine in the housing opening. The holding bars or holding pins are preferably arranged at opposite ends of the end piece which is, for example, oval or square, with the relative distance of opposite holding devices being preferably larger than the diameter of the protective cover, measured without holding means. The holding bars for the protective covers may at the same time serve as a guide for the magazine in the housing of the radiation thermometer.

The radiation thermometer of the present invention enables a two-handed operation as will be explained in the following:

Before a temperature reading is taken, the housing cap is removed from the probe and attached to the lid or to the end piece of the magazine. Then the magazine is pulled out of the housing of the radiation thermometer by the housing cap serving as a handle member, and the topmost protective cover of the stack in the magazine leading is fitted over the probe until it sits securely on the probe. The magazine is then placed back into the housing, and the temperature reading is taken. After measurement, the housing cap is removed from the end piece of the magazine and placed back onto the probe for protection. Prior to this, the used protective cover may have been removed from the probe.

As is known from WO 95/00067 previously referred to, the radiation thermometer of the present invention may include a sensor which detects whether or not a protective cover is installed. According to the present invention, this sensor is arranged and configured such that it is only actuated by the holding means if the protective cover is properly seated in place, releasing the temperature measuring function. The holding means thus dictates a specific orientation of the protective cover on the probe which may be of importance with regard to a manufacturing-related anisotropy of the optical properties of the protective covers for the repeatability of temperature measurements.

BRIEF DESCRIPTION OF THE DRAWINGS

Embodiments of the present invention will be described in the following with reference to the accompanying drawings. Further embodiments are set forth in the description. In the drawings.

DETAILED DESCRIPTION OF THE PREFERRED EMBODIMENTS

Figure 1:
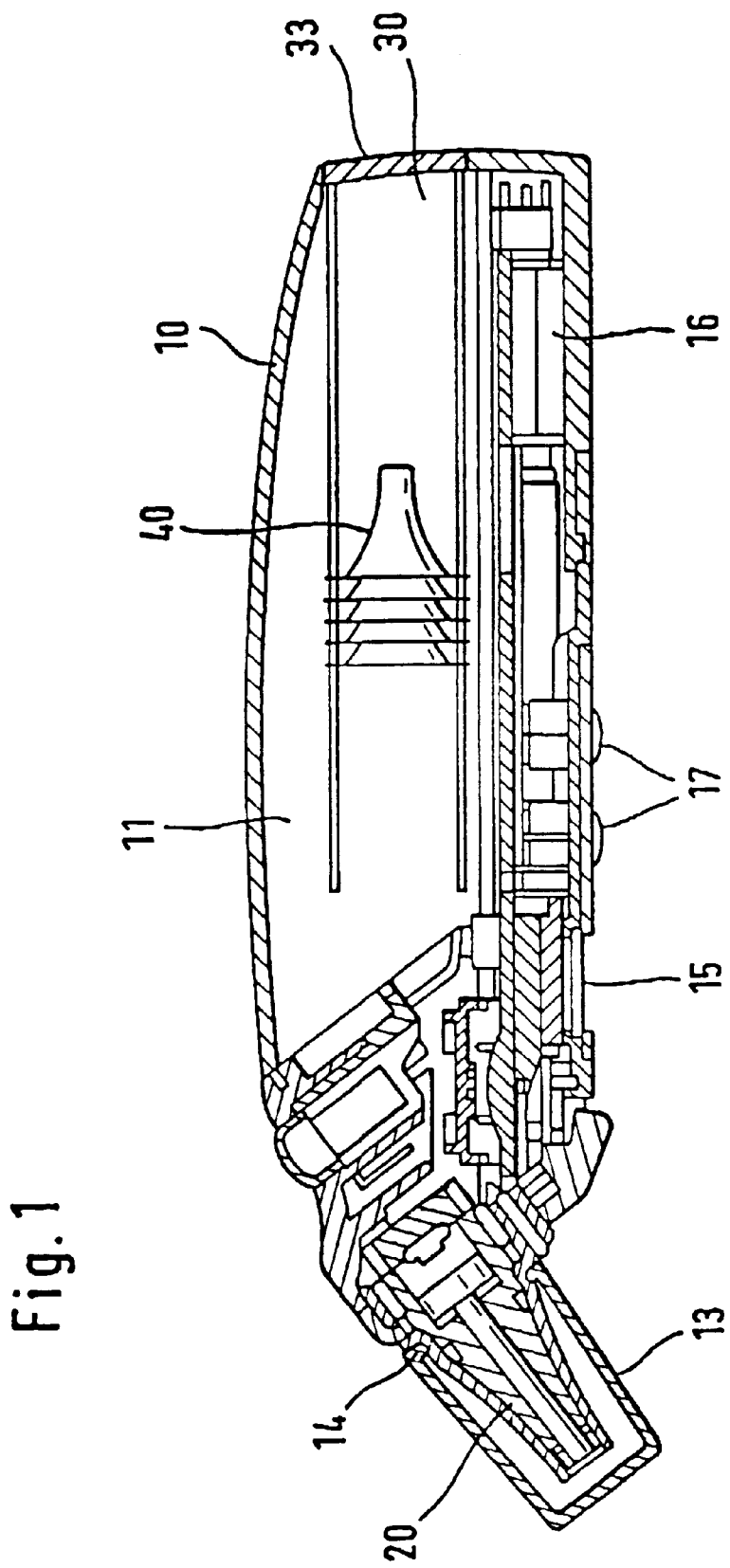
FIG. 1 is a schematic longitudinal sectional view of a radiation thermometer in accordance with an embodiment of the present invention.

The radiation thermometer shown in FIG. 1 schematically includes an elongated housing 10 which is dimensioned so as to be surrounded by and fit snugly in a user's hand. Extending in the upper part of the housing 10 in the longitudinal direction is a cavity 11 which is accessible through an opening provided at one end of the housing 10. At the opposite end of the probe is a probe 20 accommodating a temperature sensor in a manner known in the art. The lower part of the housing 10 accommodates also in a known manner a printed circuit board with an electronic evaluation circuitry which is electrically connected to the probe, an indicating device 15, at least one battery 16 and, controls 17. Fitted over the probe is a housing cap 13 having a fixing bead 14 on its rim.

Figure 3:
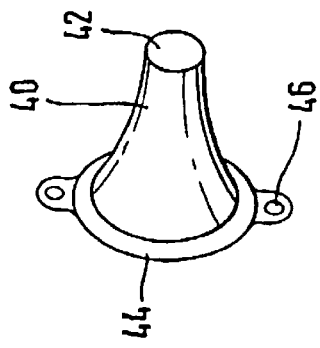
FIG. 3 is an isometric view of a protective cover illustrating a first embodiment thereof.
Figure 2B:
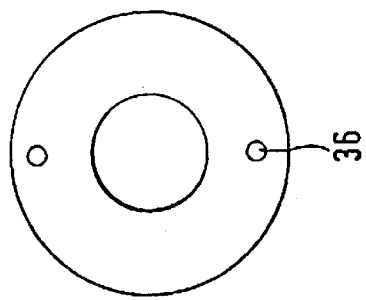
FIG. 2b is a top plan view of a protective cover magazine according to the first embodiment.
Figure 2A:
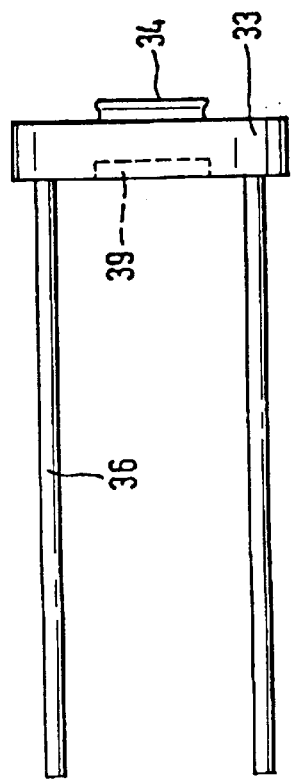
FIG. 2a is a longitudinal view of a protective cover magazine illustrating a first embodiment thereof.

The cavity 11 receives a magazine 30 in which several protective covers 40 are stacked. An end piece 33 of the magazine closes the opening of the housing 10. The magazine 30 has two holding pins 36 (FIG. 2) for supporting the protective covers 40. The protective covers 40 (FIG. 3) are of a funnel-shaped conical configuration known in the art, with a rim 44 being provided in the area of their largest diameter. At the end of the protective cover 40 remote from the rim 44 is a window 42 transparent to infrared radiation. Formed on the rim 44 are two eyelets 46 (FIG. 3) through which the holding pins 36 fit. Therefore, the protective covers 40 may be threaded on and nested between the holding pins such that the rim 44 of the topmost protective cover is accessible, and the conically tapering end of the bottommost protective cover is held in a conformably shaped recess 39 in the end piece 33. The end piece 33 has a flange 34 on which the housing cap 13, 14 is attachable.

Figure 5:
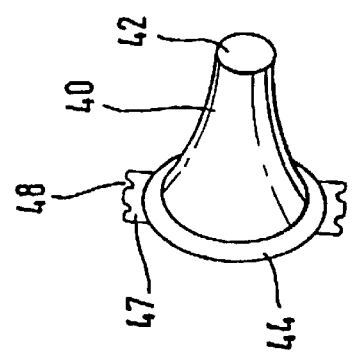
FIG. 5 is an isometric view of a protective cover illustrating a second embodiment thereof.
Figure 4B:
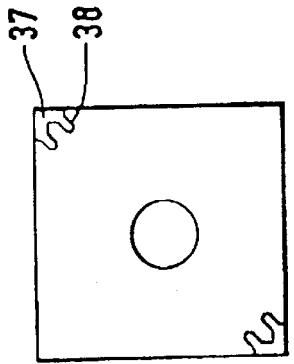
FIG. 4b is a top plan view of a protective cover magazine according to the second embodiment.
Figure 4A:
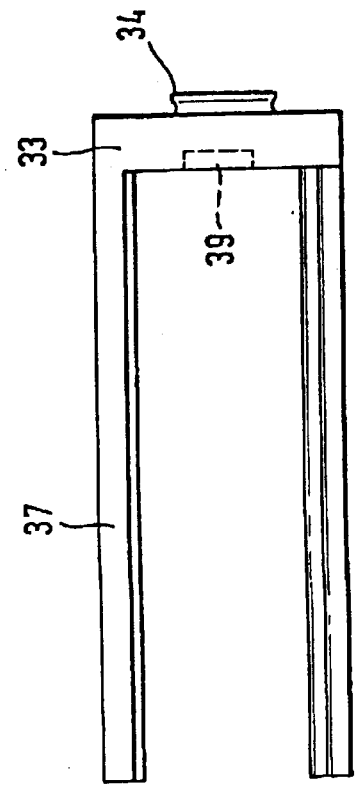
FIG. 4a is a longitudinal view of a protective cover magazine illustrating a second embodiment thereof.

In the embodiment illustrated in FIGS. 4a and 4b, the magazine has two holding bars 37 which are provided with holding noses 38. On the rims of the protective covers are holding tabs 47 with notches 48 for engagement with the holding noses 38 (FIG. 5).

The holding means, that is, the holding tabs 47 and eyelets 46, are preferably made of the same material as the rim of the protective cover, in particular from a plastic. This makes it possible in production to form these holding means integrally with the rim.

What is claimed is:

1. An infrared radiation thermometer for performing a temperature measurement in a person's ear, including a housing (10) with a probe (20) which may be provided with an exchangeable protective cover (40), characterized in that a cavity (11) for receiving a plurality of nested, funnel-shaped, conically-configured protective covers (40) is provided in the radiation thermometer, and that the housing (10) includes a lid (33) providing access to the cavity (11) when opened.

2. The radiation thermometer as claimed in claim 1, characterized in that it includes a magazine (30) for said plurality of protective covers (40) which is connected to the lid (33).

3. The radiation thermometer as claimed in claim 2, characterized in that it includes a holding device (30) for at least one protective cover (40) which is insertable in the cavity (11).

4. The radiation thermometer as claimed in claim 2, characterized in that it includes a housing cap (13) for protection of the probe (20).

5. The radiation thermometer of claim 2, wherein the magazine (30) includes at least one holding pin (36) or at least one holding bar (37).

6. The radiation thermometer as claimed in claim 1, characterized in that it includes a magazine (30) for said plurality of protective covers (40) which is insertable in the cavity (11).

7. The radiation thermometer as claimed in claim 6, characterized in that it includes a housing cap (13) for protection of the probe (20).

8. The radiation thermometer of claim 6, wherein the magazine (30) includes at least one holding pin (36) or at least one holding bar (37).

9. The radiation thermometer as claimed in claim 1, characterized in that it includes a housing cap (13) for protection of the probe (20).

10. The radiation thermometer as claimed in claim 9, characterized in that the housing cap (13) is demountably attachable to the housing (10) in the area of the probe, to the holding device (30) and/or to the lid (33).

11. The radiation thermometer as claimed in claim 10, characterized in that the housing cap (13) is attachable to the housing (10) of the radiation thermometer, to the lid (33) and/or to the holding device (30) by means of a detent connector (14, 34) or a bayonet connector.

12. The radiation thermometer as claimed in claim 9, characterized in that the housing cap (13) is attachable to the housing (10) of the radiation thermometer, to the lid (33) and/or to the holding device (30) by means of a detent connector (14, 34) or a bayonet connector.

13. A protective cover for a radiation thermometer as claimed in claim 1, characterized in that it includes holding means (46; 47, 48) for releasably mounting it on a magazine (30).

14. The protective cover as claimed in claim 13, characterized in that it includes at least one eyelet (46).

15. The protective cover as claimed in claim 13, characterized in that it includes at least one holding tab (47) with at least one notch (48).

* * * * *